United States Patent [19]

Hertel et al.

[11] Patent Number: 4,740,115

[45] Date of Patent: Apr. 26, 1988

[54] BROACH

[75] Inventors: Günther Hertel; Karl G. Hertel, both of Nuremberg, Fed. Rep. of Germany

[73] Assignee: Karl Hertel GmbH, Fürth, Fed. Rep. of Germany

[21] Appl. No.: 915,009

[22] PCT Filed: Jan. 20, 1986

[86] PCT No.: PCT/DE86/00016

§ 371 Date: Sep. 19, 1986

§ 102(e) Date: Sep. 19, 1986

[87] PCT Pub. No.: WO86/04278

PCT Pub. Date: Jul. 31, 1986

[30] Foreign Application Priority Data

Jan. 22, 1985 [DE] Fed. Rep. of Germany ....... 3501978
Mar. 22, 1985 [DE] Fed. Rep. of Germany ....... 3510486
Apr. 4, 1985 [DE] Fed. Rep. of Germany ....... 3512291
Apr. 4, 1985 [DE] Fed. Rep. of Germany ....... 3512304

[51] Int. Cl.⁴ .................... B23D 43/04; B23D 37/00
[52] U.S. Cl. ......................... 407/15; 407/18; 407/114; 409/260
[58] Field of Search .............. 407/13, 15, 18, 19, 407/113, 114; 409/247, 253, 260, 262, 263, 268

[56] References Cited

U.S. PATENT DOCUMENTS 3,548,474 12/1970 Meyer ................................. 407/17
4,243,347 1/1981 Clapp et al. ........................ 407/15
4,273,479 6/1981 Raupp, Jr. et al. ................ 407/113

FOREIGN PATENT DOCUMENTS 0745610 7/1980 U.S.S.R. ............................. 407/13
0837630 6/1981 U.S.S.R. ............................. 409/268
0916152 3/1982 U.S.S.R. ............................. 409/268

Primary Examiner—Nicholas P. Godici
Assistant Examiner—Richard K. Seidel
Attorney, Agent, or Firm—Spencer & Frank

[57] ABSTRACT

A broach for working the services of pre-cast or pre-formed pins on workpieces while the workpieces are rotating, including a broach body and having a number of sections including a roughing section provided with cutting elements including perforated reversible plates fastened therein. The cutting plates are formed of a hard cutting material and have cutting edges which converge toward each other in a pushing direction of the broach during working along lines defining opposites acute angles symmetrical with respect to the longitudinal axis of the broach.

56 Claims, 13 Drawing Sheets

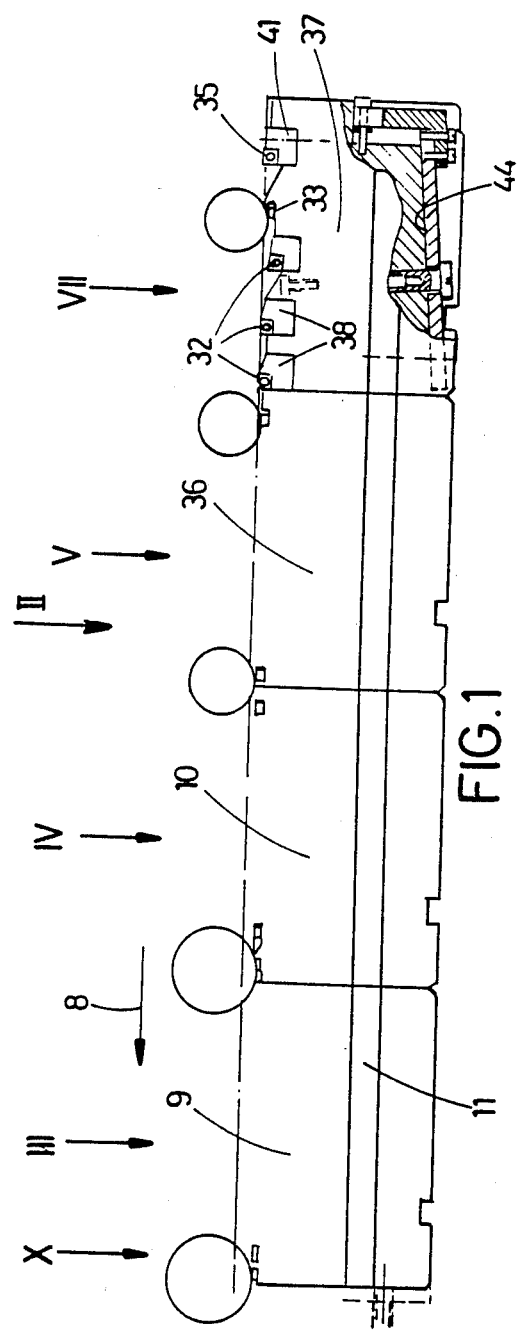
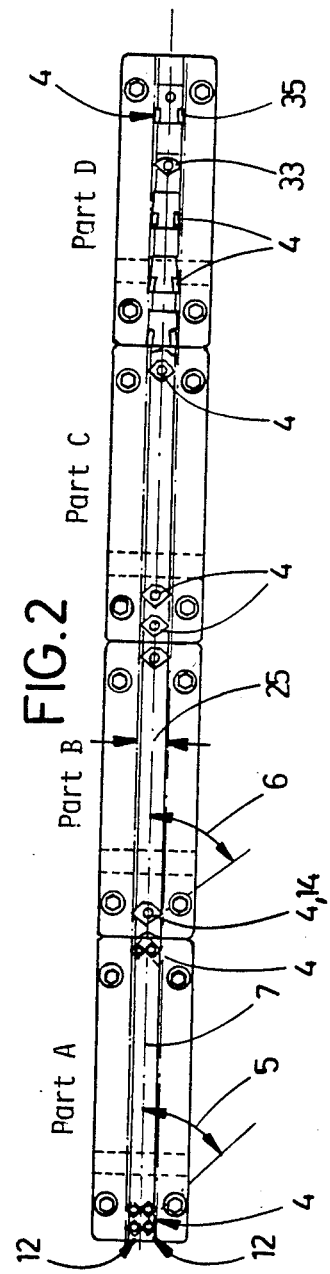
FIG.1
FIG.2

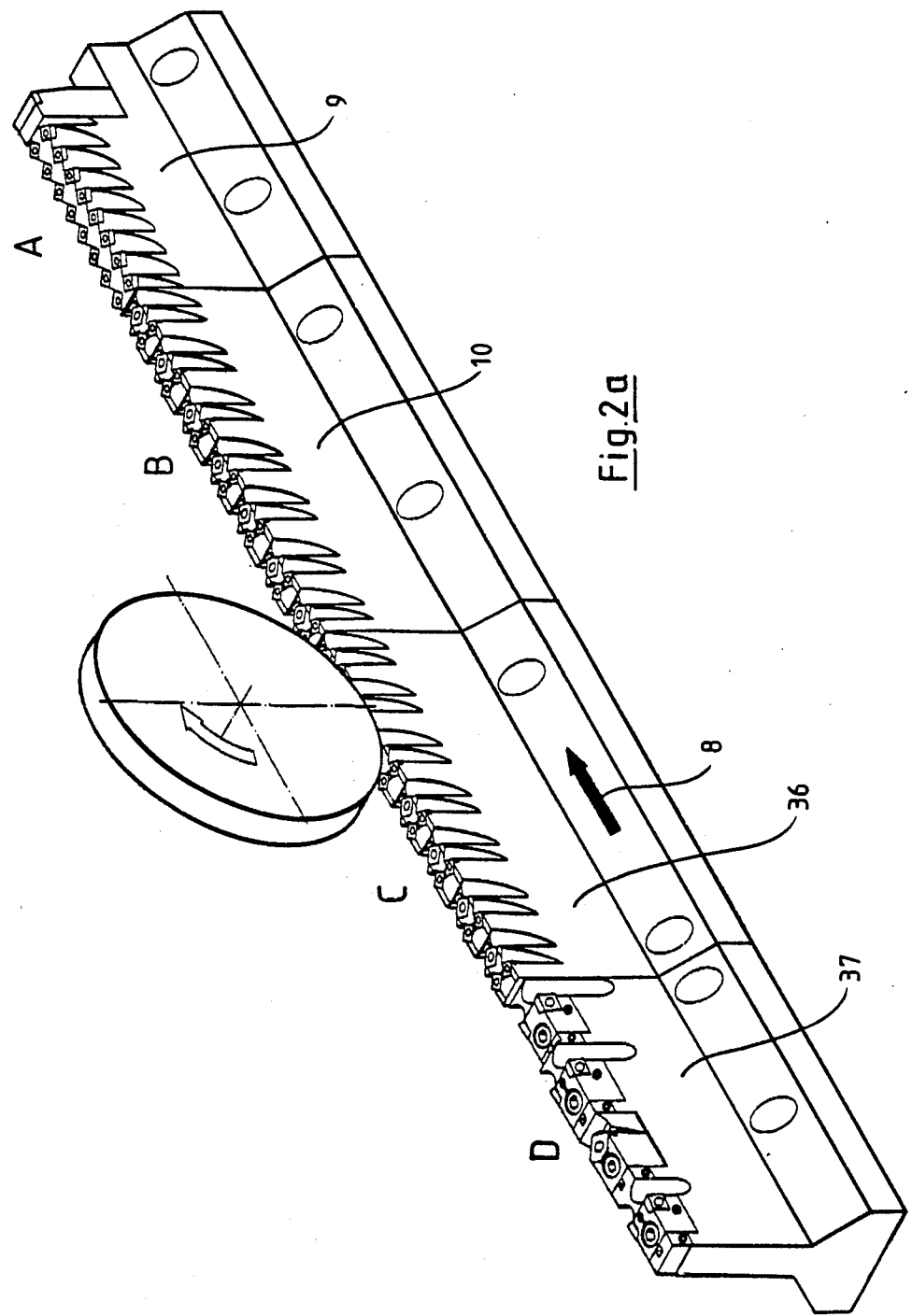

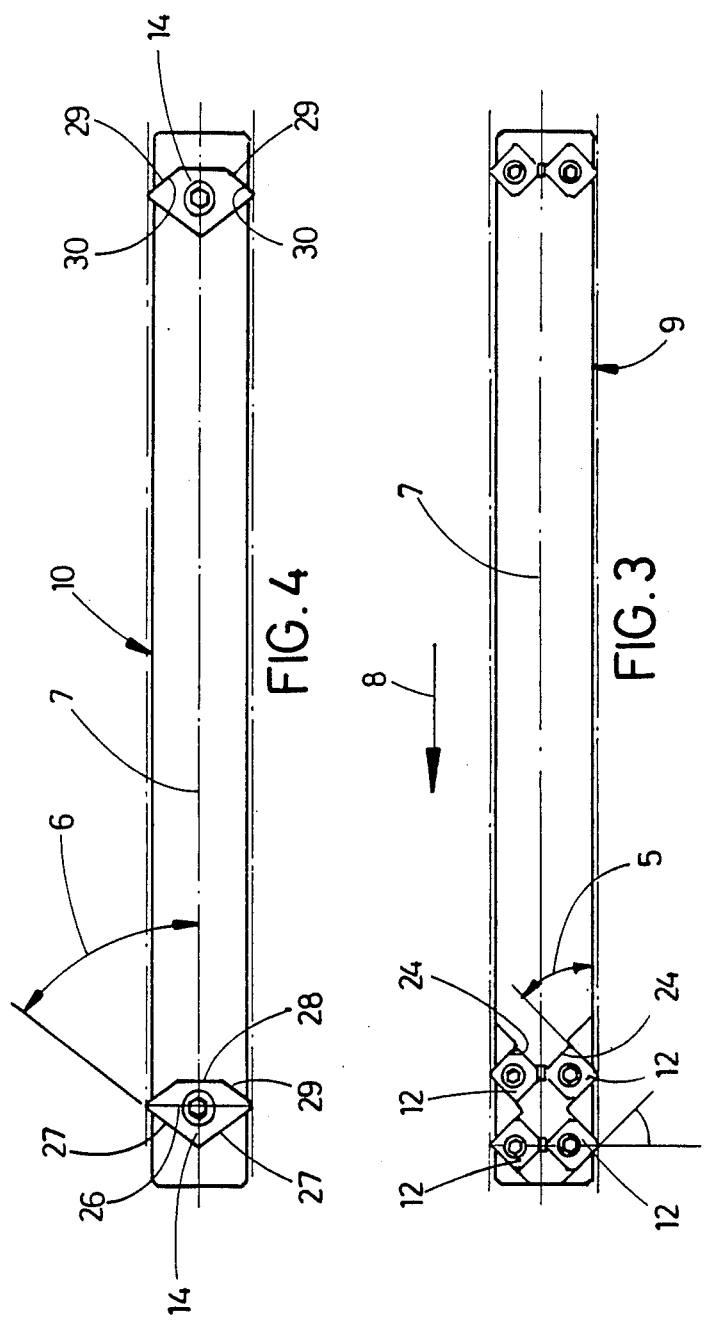

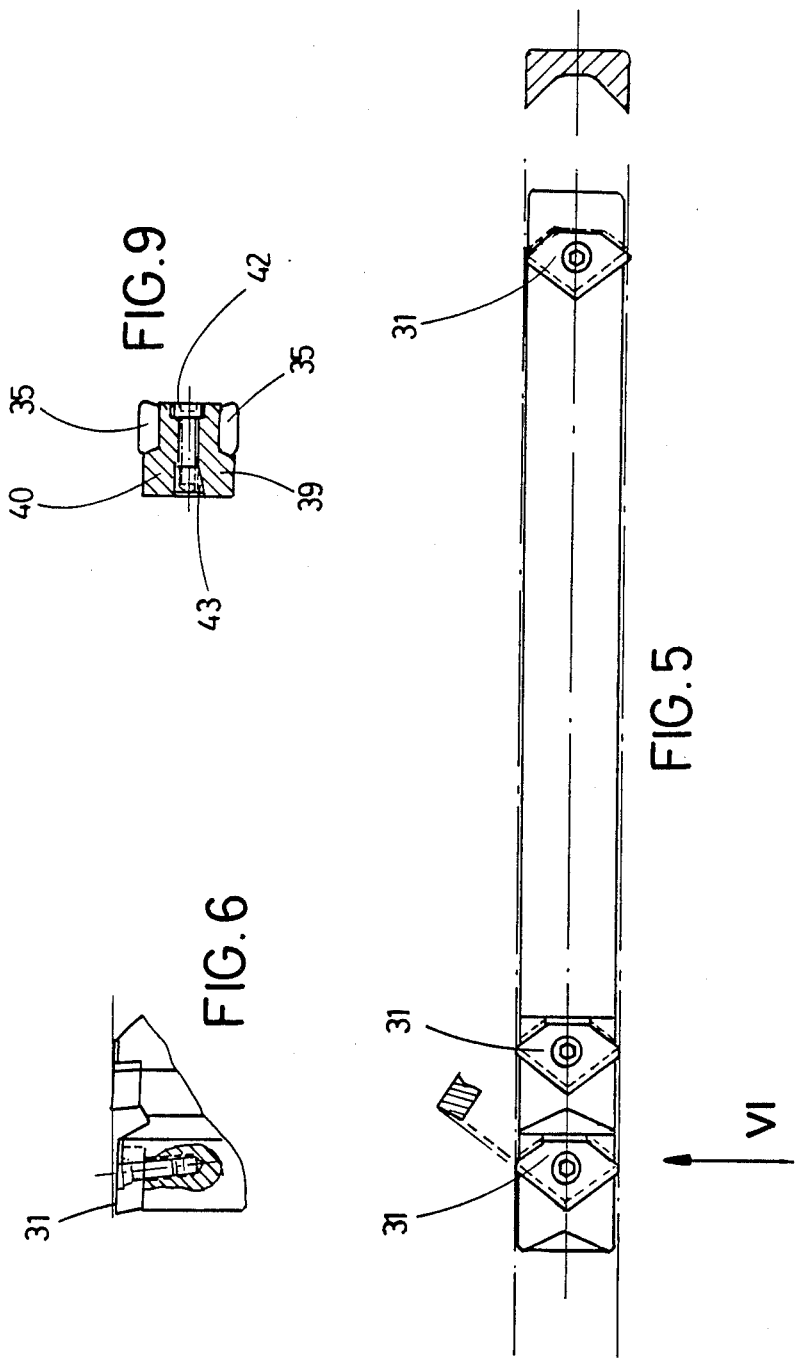

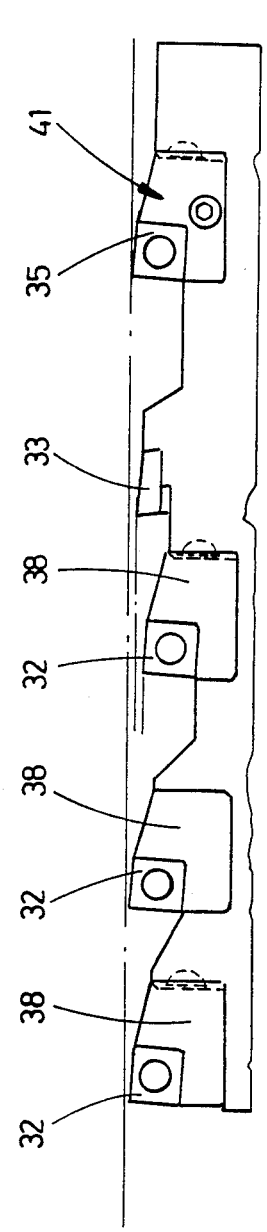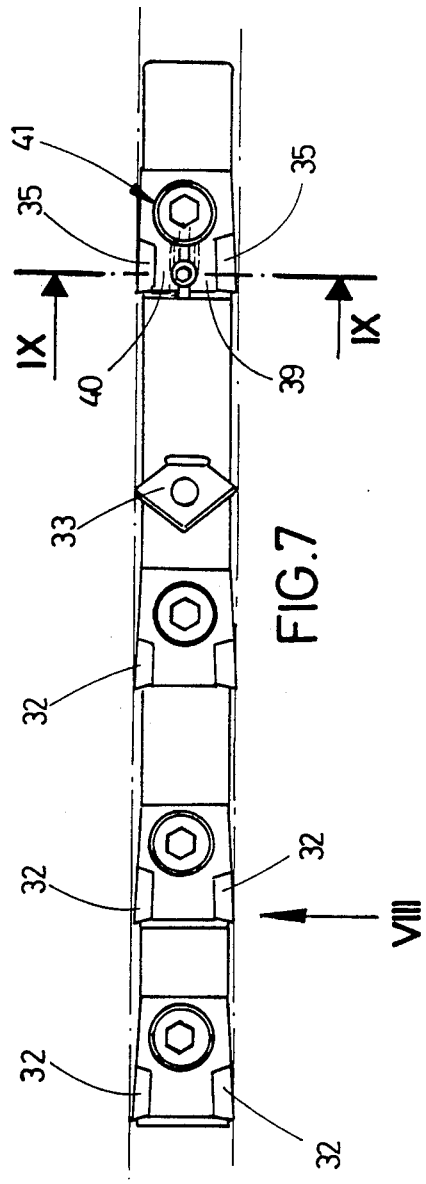

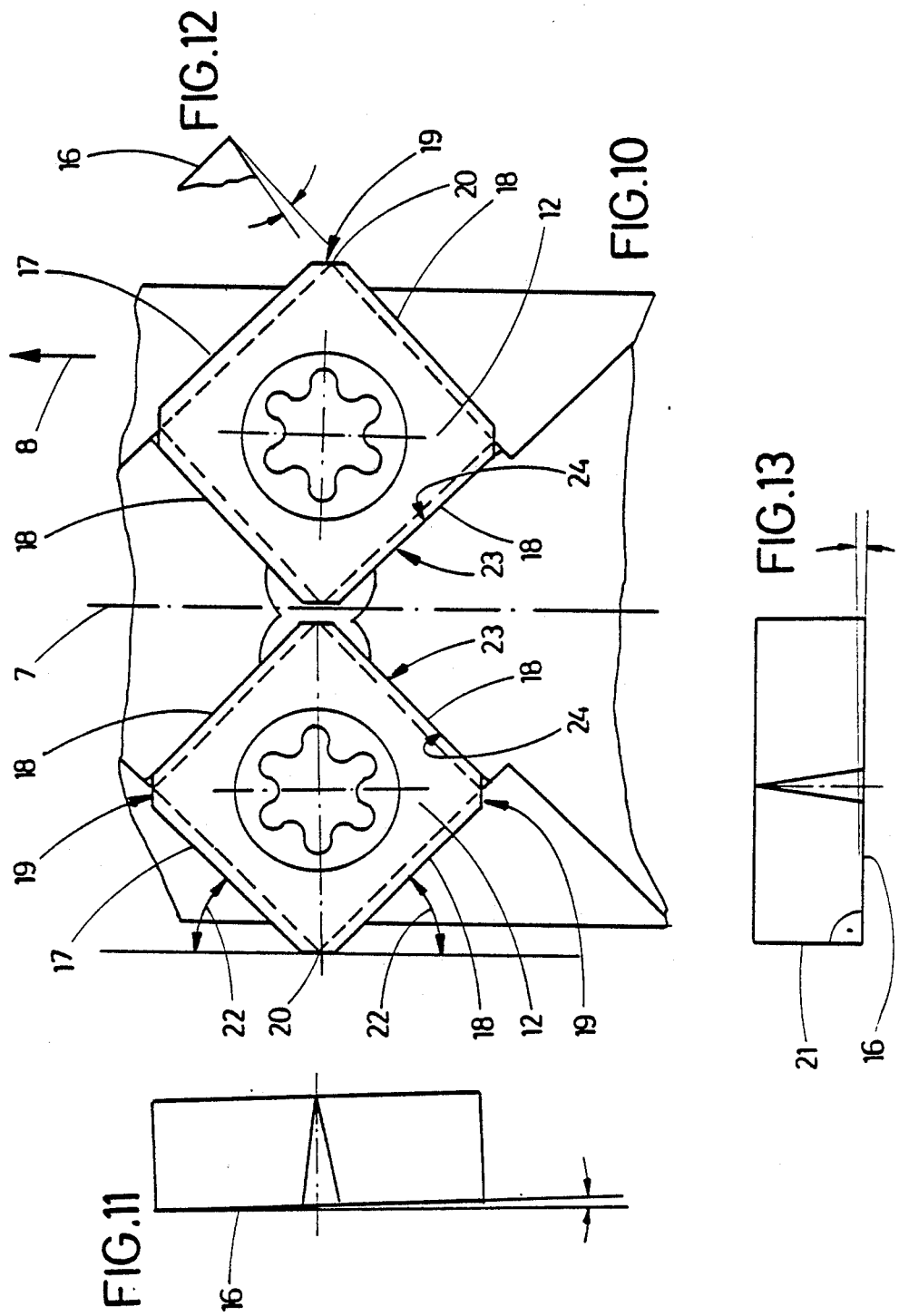

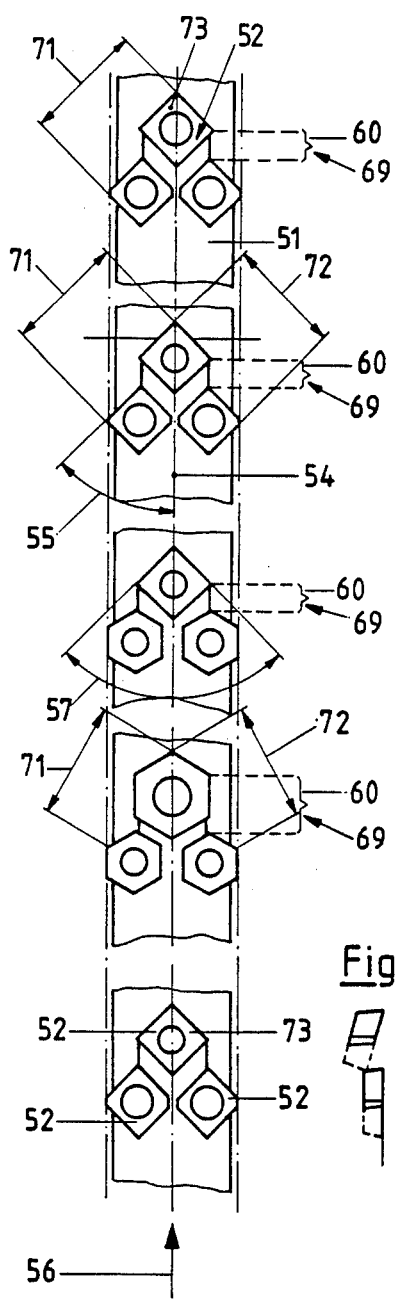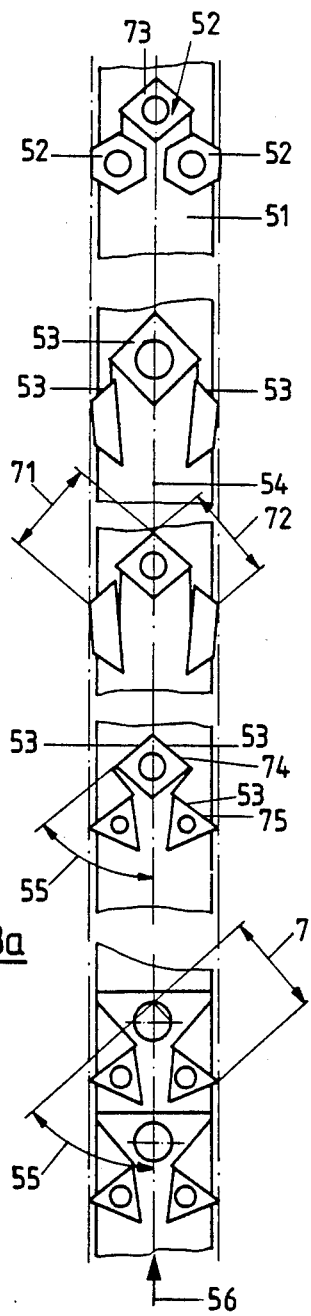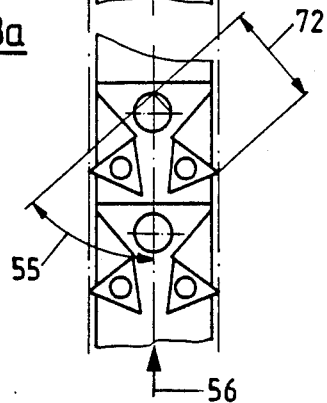

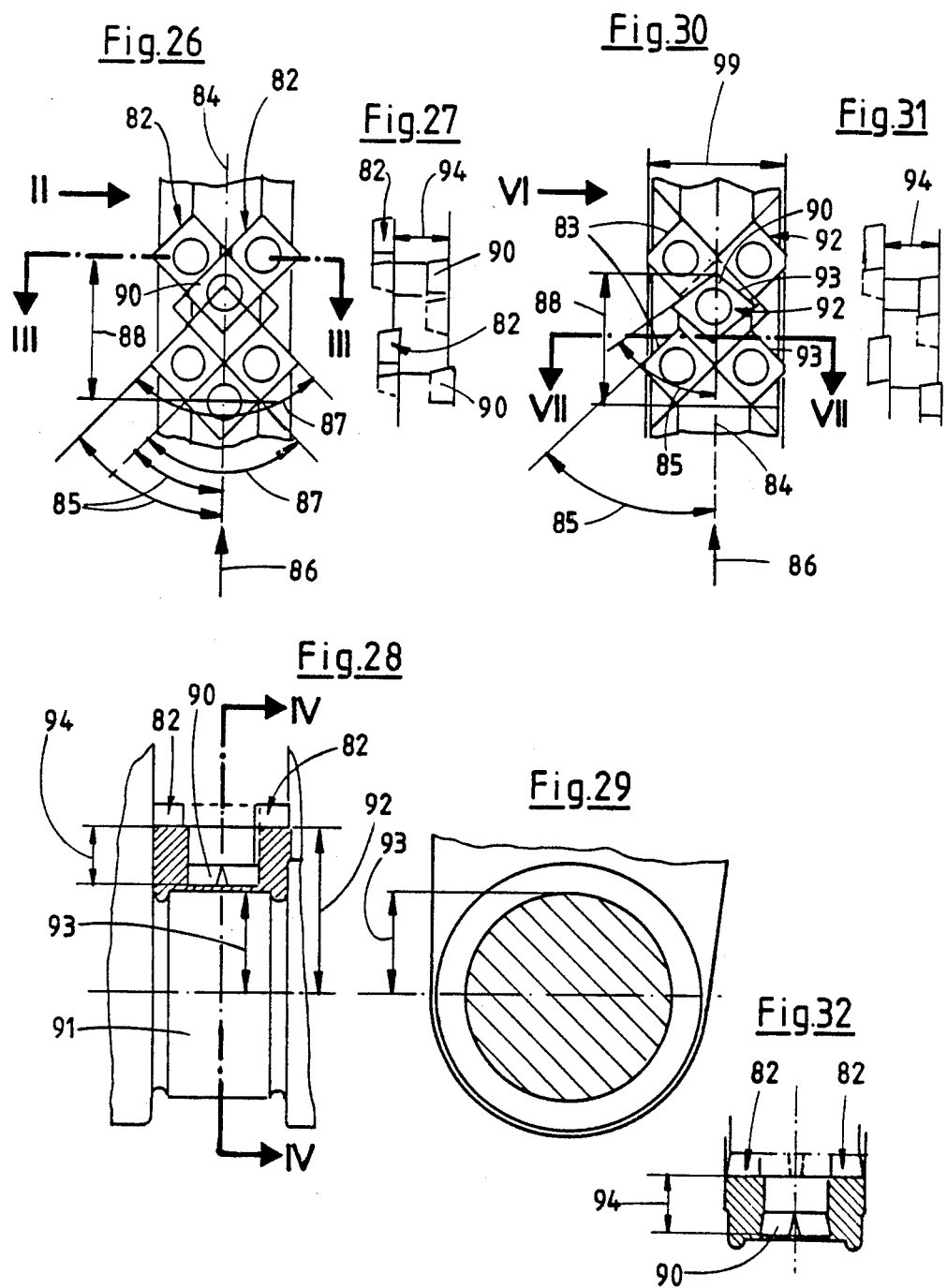

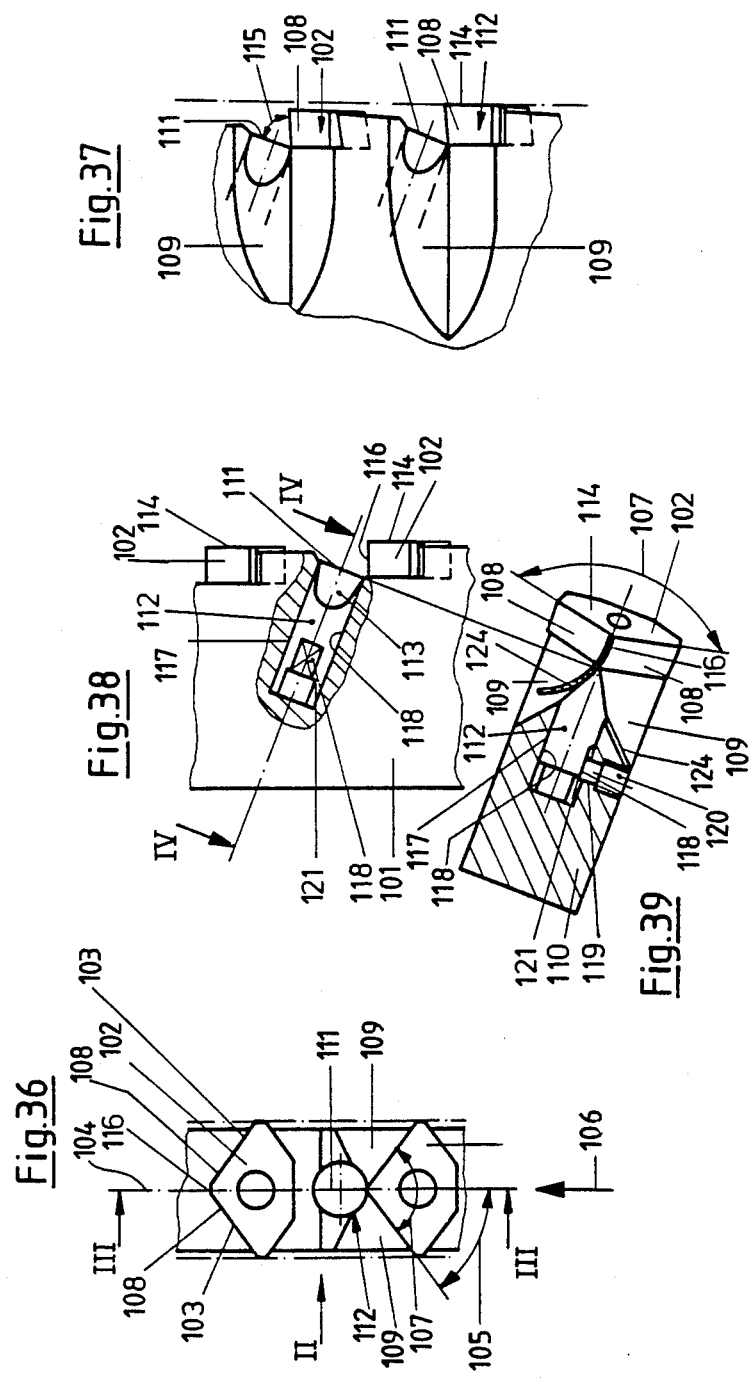

BROACH

BACKGROUND OF THE INVENTION

The invention relates to a surface working broach for working the surfaces of forged cylindrical pins on workpieces, particularly for crankshafts, during rotation of the workpieces.

Customarily, crankpins as well as the major pins and the journal pins of cast or forged crankshafts are worked by rough turning or circular milling with subsequent finish turning and grinding. Roughing of the crankpins as produced by circular milling results in a polygonal surface configuration. To produce a round surface in the individual regions of the pin already at the end of the machining process, it is absolutely necessary to add the turning or grinding process.

The customary use of two different cutting processes to produce crankshaft pins involves considerable expenditures for machinery. To avoid these expenditures, it has already been proposed to effect the machining, particularly of crankshaft pins, by so-called rotary broaching. In this process, the workpiece is caused to rotate about the axis of the pin to be worked as in milling. The broach is then guided tangentially along the pin or pins to be worked. If a plurality of coaxial pins are to be worked on the crankshaft, all pins are worked simultaneously by separate broaches in one broach feed. With this proposed, rotary broaching, processing speeds of about 250 m/min result while conventional broaching at stationary workpieces takes place at speeds between 35 and 45 m/min, depending on the material involved.

SUMMARY OF THE INVENTION

It is an object of the invention to configure a broach of the above-mentioned type so that it is suitable for mass production meeting high precision requirements. This is accomplished by the feature wherein the cutting edges of the broaches are parts of exchangeably fastened cutting elements made of a hard cutting material and, in order to perform a trailing cut, enclose an acute angle with the longitudinal broach axis at least in the roughening section of the broach.

During rotary broaching there exists the additional problem that one cutting edge of the broach must be in cutting engagement with the workpiece over at least one revolution of the latter. This results in a certain minimum chip length which normally cannot be reduced in size. It is here assumed that the cutting edges of the broach perform a trailing cut. This means that the chips are not discharged at a right angle to the cutting edges but that the cutting region on the cutting edge travels during the cutting process from the inner end of a cutting edge in the region of the longitudinal center axis to its outer end, i.e. starting in the center of the groove to be broached and moving toward its outer region. This travel of the chip cutting region and the discharge of the chips in a direction other than at a right angle to the cutting edge makes the arrangement of conventional chip breaking grooves, chip breaking projections or the like at or on the cutting surfaces of the cutting element ineffective.

It is therefore a further object of the invention to give a broach of the above-mentioned type such a configuration that the chip formed by each cutting edge of the broach which extends from the longitudinal center axis to the side edge of the broach is effectively broken at comparatively short intervals and thus the removal of chips is enhanced even in workpiece materials which cause problems with respect to chip formation. This is accomplished by the characterizing features wherein the cutting edges of the broach enclose a bow angle which opens in a direction opposite to their direction of feed and the cutting edges are interrupted between their inner and outer ends. Thus, the chip of a cutting edge performing a trailing cut starts at the longitudinal center axis and moves only to an interruption where it breaks off. The continuation of the cutting edge between the interruption and the outer edge of the broach or a further interruption forms a new, separate chip.

According to the characterizing feature of claim 32, the interruptions are formed by the gaps between two cutting elements disposed one behind the other in a staggered arrangement. This configuration has the further advantage that even larger groove widths and these again with practically infinitely variable width dimensions can be produced with cutting elements of fixed dimensions. In particular, for reasons of economy, these cutting elements may be International Standardization Organization, now called International Organization for Standardization, and standard plates. It already constitutes a savings if the cutting elements in the form of ISO or standard plates are given their final shape by grinding. Setting the effective width of the two cutting element cutting edges arranged on the broach in juxtaposition at both sides of its longitudinal center axis is then effected merely by appropriate positioning of the plates on the broach body.

In the broach according to the invention, work in the first-cut region (here called subsection A) involves only the cutting of the shoulder allowance by means of shoulder cutting plates. Only in the second subsection (here called subsection B) of engagement of the broach is the broach equipped with face cutting plates for working the pin allowance.

The further feature of the invention is based on the premise that the workpiece to be worked by circular broaching already has a deformation in the form of the groove to be shaped, as is the case, for example, for drop forged or cast crankshafts. It may be a drawback in connection with broaches for working such workpieces if only the shoulder allowance is worked in the first-cut region (subsection A) with a correspondingly small amount of chip production, while work on the pin allowance with the correspondingly high amount of chip development begins only in the second subsection (subsection B). The large amount of chip development (roughing) in connection with working the pin allowance, which begins only after the first-cut region, results in increased vibratory stresses on the broach in the rear subsection (section D) intended for finishing. This may result in disadvantageous vibratory influences particularly on the finishing zone of the broach which is of importance for neat surface work.

It is therefore a further object of the invention to give a broach of the above-mentioned type such a configuration that damaging vibratory influences on its finish section are suppressed as much as possible. The solution of this problem is provided by the characterizing features wherein each cutting unit is composed of an odd number multiple of cutting elements whose foremost cutting element, when seen in the direction of feed, forms an initial cutter and is centered with respect to the longitudinal center axis and whose further cutting elements are arranged in pairs staggered behind one another with respect to the direction of feed, with the initial cutter projecting beyond the flanks of the other cutting elements in the direction toward the workpiece. In this way, a large amount of the roughing work and of the chip volume is moved to the first-cut section of the broach. For example, the casting or forging skin which may still be present is removed on all sides already in the first-cut section. For the finishing and fine work, which generates less vibrations, more of the length of the broach is then available. The remaining chip volume is distributed over a longer length of the broach. This results in improved surface quality of the workpiece. Moreover, the invention makes it possible to work with plates similar to standardized plates in the roughing region. This has the advantage that less expensive cutting elements can be used particularly for the region of the broach which is under especially great stress and thus more subject to wear.

The two cutting edges of the center cutting element, when considered with respect to the longitudinal center axis of the broach, may extend over the entire width of the groove, which is the case particularly in the finishing section of the broach. However, another embodiment of this cutting element, preferred in the roughing section of the broach, does not extend over the entire width of the broach. In such cases, the cutting element performs the function of a roughing cutter which—with reference to the direction of feed—is followed by a staggered arrangement of cutting elements which extend behind it into the lateral regions of the broach. The bow-like pushing edge of this cutting element, which lies in the vertical plane of the longitudinal center axis of the broach and is disposed between the cutting faces of this cutting element at both sides of the longitudinal center axis, is subjected to particularly great wear in the region of the cutting tip so that in this region no accurate separation of chips can be assured. The result is that the two chips formed after the first cut by the cutting edges performing the trailing cut have no unequivocal lateral orientation in the first cut performed by the cutting element. The chips are separated, without external influence being possible, on the one as well as the other side of the longitudinal center axis of the broach and thus of the bow-like pushing edge between the cutting faces of the cutting element disposed at both sides of the longitudinal center axis. This creates the danger that the discharged chip is caught at the saddle between chip discharge chambers disposed on both sides of the longitudinal center axis and forms an obstacle for later chips.

It is a further object of the invention to prevent outflowing chips from being caught in the region of the center cutting element and thus to improve chip removal behavior. The solution to this problem is provided by characterizing features wherein a chip removal chamber is disposed at the broach body in front of the cutting faces of the cutting element disposed on both sides of the longitudinal center axis when seen in the direction of broach feed; both chip removal chambers are separated from one another by a ridge extending in the direction of the longitudinal axis of the broach; and the ridge is formed by the head of a separating element made of a wear resistant material, particularly of a hard metal, that is inserted into the broach. These features assure reliable chip separation in a manner which is very robust and thus resistant to wear.

The feature wherein the ridge ascends in the direction of broach feed in such a manner that it encloses an acute angle with the flank of the cutting element, said angle closing in the direction of feed enchances lateral chip removal. The feature wherein the ridge begins at the lower end of the bow-like pushing edge facing away from the cutting edge, between the cutting element cutting faces, and continues in the direction of broach feed, causes the separating element to cover the entire chip intake region. The feature wherein the bow-like pushing edge is interrupted by a chamfer between the cutting element cutting faces, makes it possible to shape right from the start the bow-like pushing edge between the cutting element cutting faces so that it is particularly resistant to wear. Because of these features, the uncertainty of the location of chip separation connected therewith remains without negative consequences for the discharge of chips.

The feature wherein outside its ridge flanks, the separating element is provided with a cylindrical shaft and its cylindrical shaft is held in a correspondingly configured recess of the broach body provides for simple mounting of the separating element within the broach. The feature wherein in the region of the cylindrical shaft, the separating element is provided with a planar flattened portion which is parallel to the ridge and to the cylinder axis and said flattened portion is charged by the essentially planar frontal face of the head of a compression screw screwed from the side into the broach body, permits secure fixing as well as aligning of the ridge of the separating element in the longitudinal direction of the broach.

The characterizing feature of claim 54 permits removal of the separating element from the shaft of the broach for the purpose of exchange.

BRIEF DESCRIPTION OF THE DRAWINGS

The invention will be described in greater detail with reference to embodiments that are illustrated in the drawing figures. It is shown in:

FIG. 1, a side view of the complete broach;

FIG. 2, a top view of the broach according to arrow II in FIG. 1;

FIG. 2a, a perspective view of the broach;

FIG. 3, a top view along arrow III of FIG. 1 of the front portion (marked "Part A") of the broach;

FIG. 4, a top view along arrow IV of FIG. 1 of the portion of the broach marked "Part B";

FIG. 5, a top view along arrow V of FIG. 1 of the portion of the broach marked "Part C";

FIG. 6, a detail side view along arrow VI of FIG. 5,

FIG. 7, a top view of the finishing part of the broach marked "Part D" in FIG. 1;

FIG. 8, a side view along arrow VIII of FIG. 7 of part D of the broach;

FIG. 9, a sectional view along line IX—IX of FIG. 7;

FIG. 10, an enlarged top view along arrow X of FIG. 1 of a pair of cutting elements of first-cut part A of the broach;

FIG. 11 to FIG. 13, various side views of the cutting elements of first-cut part A showing the respective rake and back rake angles of the cutting elements in their cutting positions;

FIG. 18 and FIG. 19, top views of the cutting face sides of two different broach embodiments;

FIG. 18a and FIG. 19a, detail side views of the cutting elements of FIGS. 18 and 19;

FIG. 26, a top view of the flank side of a section of the broach;

FIG. 27, a side view of the broach section corresponding to arrow II of FIG. 26;

FIG. 28, a vertical sectional view along line III—III of FIG. 26 of the broach in engagement with a workpiece (crankpin of a crankshaft);

FIG. 29, a vertical sectional view of the crankpin seen along line IV—IV of FIG. 28;

FIG. 30, a top view of a modified embodiment of a section of the broach analogous to FIG. 26;

FIG. 31, a side view corresponding to arrow VI of FIG. 30;

FIG. 32, a sectional view along line VII—VII of FIG. 30, analogous to FIG. 28, with the broach in the engaged position at the crankpin;

FIG. 36, a top view of the flank of a section of the broach;

FIG. 37, a side view of the section corresponding to arrow II of FIG. 36, showing the cutting grooves flanking the broach;

FIG. 38, a side view analogous to FIG. 37 including a partial sectional view of the separating element seen along line III—III of FIG. 36;

FIG. 39, a sectional view along line IV—IV of FIG. 38.

DESCRIPTION OF THE PREFERRED EMBODIMENT

Figure 14:
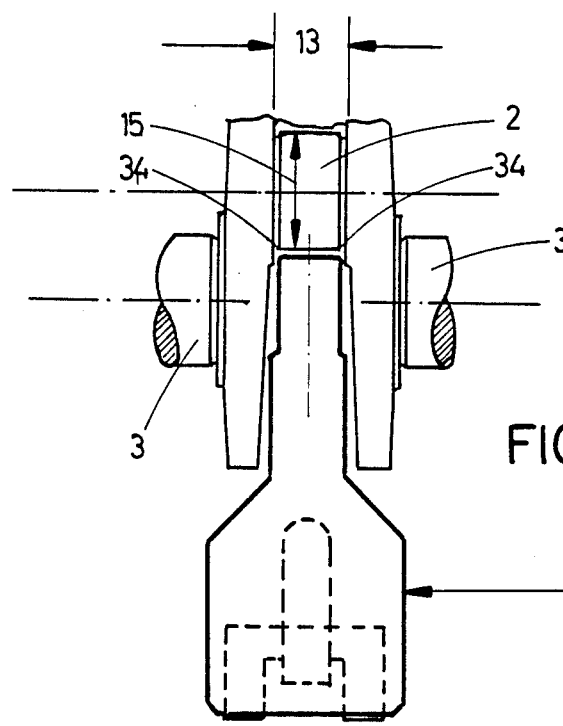
FIG. 14, a schematic side view of a crankshaft seen in the direction of feed of the broach with the broach in the engaged position.

The broach 1 serves to work the surfaces of crankpins 2 as well as journal pins 3 of, for example, a crankshaft. The crankshaft is here caused to rotate about the axis of the respective bearing pin to be worked. The cutting edges of the broach are parts of cutting elements exchangeably fastened to the broach body and made of a hard cutting material, for example a hard metal.

Over its entire length, the broach is subdivided into four parts A-D, of which parts A and B constitute the roughing section and parts C and D the finishing section.

In roughing sections A and B of the broach, the cutting edges which can be brought into engagement with the workpiece form an acute angle 5 or 6, respectively (FIG. 2) with the longitudinal axis of the broach (FIG. 2) when performing a trailing cut. This acute angle lies between 30° and 60°. The direction of feed of the broach during the broaching process is marked 8. A plurality of cutting elements 4 disposed in roughing sections A and B are fastened on a holder 9 or 10, respectively, which can be exchanged as a whole and is fastened to broach chassis 11.

The roughing section is subdivided into two subsections A and B which lie one behind the other in the direction of the longitudinal axis 7 of the broach, namely the sections including holders 9 and 10. The first subsection A is equipped with shoulder cutting plates 12 for working the shoulder allowance 13 and the second subsection B is equipped with face cutting plates 14 for working the pin allowance 15 (FIG. 14).

Shoulder cutting plates 12 are arranged in pairs next to one another at approximately a right angle to the longitudinal axis 7 of the broach. Shoulder cutting plates 12 are reversible cutting plates, more precisely perforated reversible plates, having essentially square cover faces 16. The corners of the cutting elements which lie between two adjacent cutting edges 17 and 18 of shoulder cutting plates 12 of Section A are chamfered to form a shoulder 19. The straight chamfer edge 20 and the planar shoulder flank 21 formed by chamfer edge 20 at the corner of the cutting element enclose identically sized angles 22 with the adjacent cutting edges 17 and 18, respectively, and their flanks. The respective active cutting edge in the shoulder cut—when seen with respect to the direction of feed 8—is cutting edge 17, while the remaining cutting edges 18 constitute reserve cutting edges. When the broach engages at the workpiece, the shoulder cutting plates 12 are still disposed at a considerable distance from the surfaces of pins 2, 3 of, for example, a crankshaft. Thus they come in contact with the workpiece only in the region of the cutting edges 17, which, with respect to the longitudinal axis 7 of the broach, are the outer cutting edges.

The flanks 23 of reserve cutting edges 18 of the row of juxtaposed shoulder cutting plates 12 (FIG. 10) facing the longitudinal axis 7 of the broach lie against supporting faces 24 which project upwardly from the broach chassis 11 or from its holder 9.

Face cutting plates 14 disposed in section B extend over the entire width 25 of the broach strip and are provided with essentially rhombic cover faces (FIG. 4). The longer diagonals 26 of the rhombic cover faces of face cutting plates 14 extend at right angles to the longitudinal axis 7 of the broach. Their cutting edges 27 likewise perform a trailing cut. They enclose an acute angle 6 with the longitudinal axis 7 of the broach.

The corner 28 of the rhombic plate facing away from cutting direction 8 is cut off. Thus chip chamber volume is gained in the direction of longitudinal axis 7 and adjacent face cutting plates 14 can be spaced closer together. The flanks 29 of face cutting plates 14 adjacent the cutting faces of cutting edges 27 and forming a V with one another rest against supporting faces 30 which project upwardly from broach chassis 11 or its holder 10. In this way, face cutting plates 14, when under cutting stress, are centered in the form of the letter V. When seen in section, cutting edges 27 have a positive rake angle.

The finishing region of the broach is formed by its sections C and D. These are two subsections arranged one behind the other in the longitudinal direction of the broach, the first section C also being equipped with face cutting plates 31 and the second section D being equipped with flank cutting plates 32 and one face cutting plate 33. Face cutting plates 31 in section C serve to finely work or finish the surface of the pin. When seen in section, face cutting plates 31 have a rake angle of 0°, but immediately behind the cutting face, they are provided with a recess in the manner of a hollow cut to prevent them from coming in surface contact at that point with the pin surfaces to be worked. Face cutting plates 31 have approximately the circumferential shape and bearing configuration of face cutting plates 14 of the roughing section (Section B).

Flank cutting plates 32 serve to pre-rough cut the track width and to precut two lateral relief cuts 34 for the journal pins. Two flank cutting elements 35 are also provided at the last chip cutting station in section D for a control cut and to calibrate the track width. Flank cutting plates 32 and flank cutting elements 35 are perforated reversible plates having approximately square cover faces.

The two subsections C and D each have an associated one-piece holder 36 and 37 for cutting elements 31 and 32, 33, 35 or for separate cutting element holders 38. Each holder 36 and 37 as a whole is exchangeably fastened in broach chassis 11. By arranging cutting plates 4, 12, 14, 31, 32, 33, 35 (in sections A-D on a holder 9, 10 or 36, 37, respectively) it becomes possible to release and exchange each group of cutting elements or cutting plates from the broach in one process step. This is done as a result of past experience which indicates that the wear behavior of the individual cutting plates or cutting elements within individual sections A-D is approximately the same but is different between individual sections A-D.

The flank cutting elements 35 intended for final calibration are fastened to spreadable arms 39, 40 of cutting element holder 41 which itself is fastened to a holder 37. Arms 39, 40 of cutting element holder 41 can be spread apart by means of a wedge 43 that can be displaced by means of a set screw 42, thus enabling the calibration dimensions to be set.

Section D and holder 37 intended for final calibration permit fine adjustment in that holder 37 is displaceable on a sloped plane 44 within broach chassis 11 and can be fixed in every displaced position. Thus the degree of adjustment of all of the cutting plates and cutting elements associated with this section can be changed jointly.

It is advisable to work with a reduced broach feed (arrow direction 8) in sections C and D.

In the embodiment, face cutting plates 31, 33 intended for fine working are always illustrated as having essentially rhombic configuration and as cutting edges that perform a trailing cut. It is, however, also conceivable to orient their face cutting edges—in a manner generally known in connection with broaches—at right angles to the longitudinal axis 7 of the broach.

The chip cutting sides of broach 51 are equipped with cutting elements 52 of a hard cutting material (FIGS. 18-22). To perform a trailing cut, broach cutting edges 53 enclose an acute angle 55 with longitudinal broach axis 54. Two adjacent cutting edges 53 form a vow angle 57 which opens in a direction opposite the direction of feed (pushing direction) 56 and is twice as large as acute angle 55.

Figure 15:
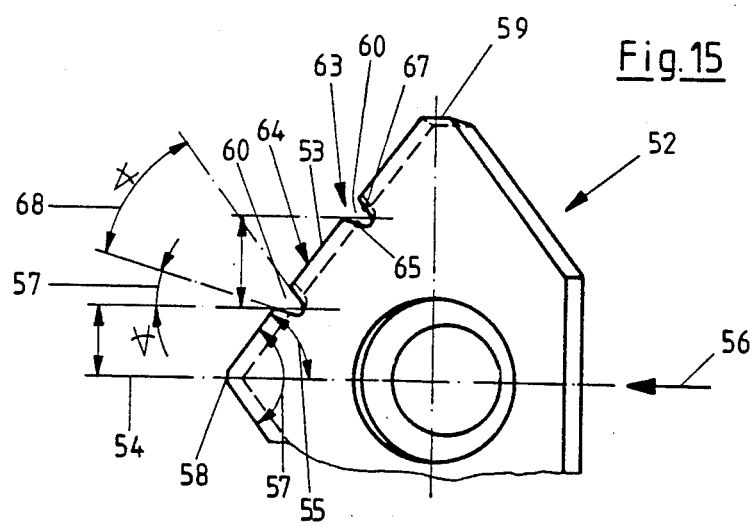
FIG. 15 to FIG. 17, top views of the cutting faces of various cutting element shapes, with the cutting elements extending over the entire width of the broach.
Figure 16:
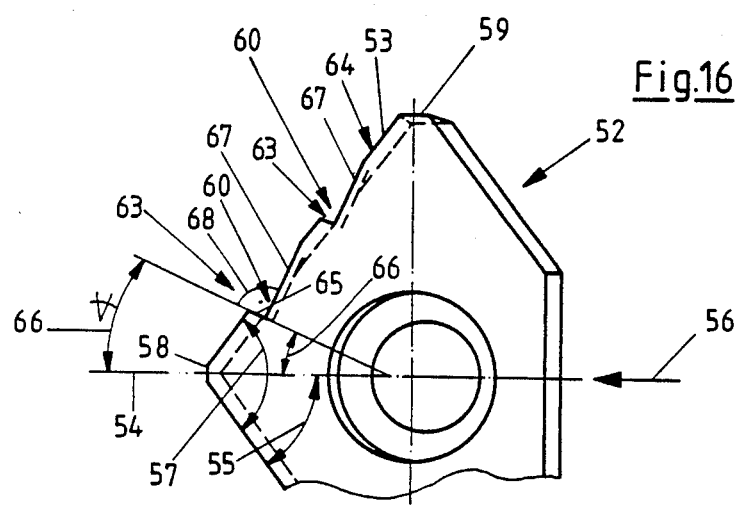
Figure 17:
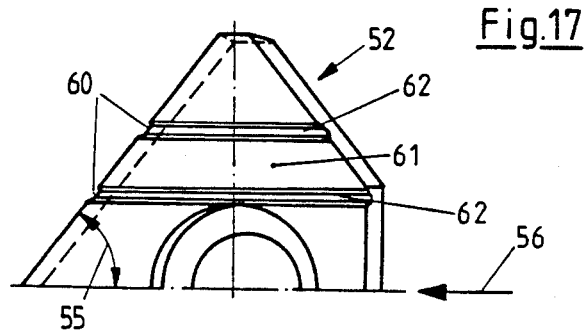
Figure 23:
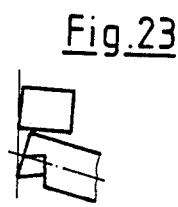
FIG. 23 to FIG. 25, schematic side views according to the directions of arrows IX—IX of FIGS. 20 to 22.
Figure 20:
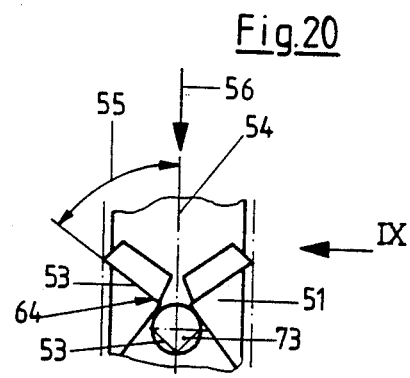
FIG. 20 to FIG. 22, plan views of the cutting faces of broach cutting edges formed by an odd-number multiple of cutting elements arranged in juxtaposition at both sides of the longitudinal center axis, or more precisely, the longitudinal center plane.
Figure 24:
Figure 21:
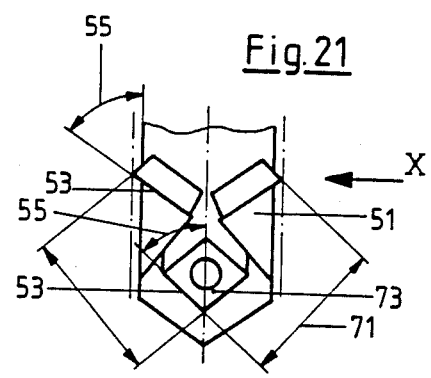
Figure 25:
Figure 22:
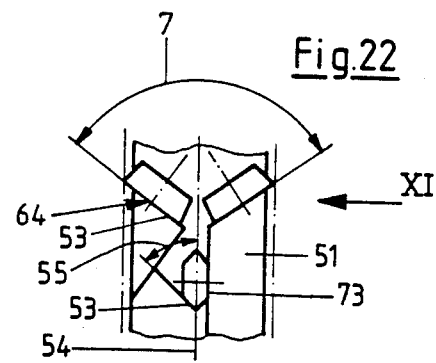

Cutting edges 53 are interrupted between their inner ends 58 and their outer ends 59. A plurality of interruptions 60 are provided on each cutting edge 53. These interruptions 60 may be formed by recesses 62 in the respective cutting element cutting face 61 (FIG. 17). One alternative (FIGS. 15 and 16) provides that the interruptions 60 are formed by flank recesses 63 in the cutting element flanks 64. Recesses 63 may have a V-shaped cross section. An alternative solution provides that the recesses have the cross-sectional shape of a U, with the arms of the U possible diverging in the direction toward their ends (FIGS. 15, 17).

Flank recesses 63 are advisably configured in such a manner that their flanks 65 facing the longitudinal center axis 54 of the broach enclose, with the longitudinal center plane extending in the direction 56 of feed or cutting and lying in the longitudinal center axis, an acute angle 66 which opens in the direction of feed 56. The longitudinal center plane here extends perpendicularly to the plane of the drawing in FIGS. 15-19 and 20-22.

The flanks 67 of flank recesses 63 facing away from longitudinal center axis 54 form flanks of secondary cutting edges formed by the cutting face. In the embodiment of FIG. 16, the spreading angle 68 between the arms of the V of flank recesses 63 is 90°. In the case of FIGS. 15 and 17, however, this spreading angle 68 is an acute angle of much less than 90°.

In the embodiments according to FIGS. 18-25, the interruptions 60 are formed by interstices 69 between a plurality of cutting elements 52 which are staggered one behind the other when seen in the direction of feed 56. To form two cutting edges 71, 72 extending next to one another over the width 70 of the broach, an odd number multiple of cutting elements 52 is provided whose foremost cutting element 73, when seen in the direction of feed 56, is centered with respect to longitudinal center axis 54. Foremost cutting element 73 is designed to be symmetrical to longitudinal center axis 54. In the embodiment according to FIG. 22, a sectional view places the longitudinal extent of foremost cutting element 73 upright in the direction of longitudinal center axis 54. Cutting elements 52, 73 are standard or ISO plates or are made, particularly ground, of such plates. Cutting sections 74 and 75 disposed on one side of the longitudinal center axis may also be placed at different angles 55 with respect to longitudinal center axis 54.

The flanks of broach 81 (FIGS. 26, 30, 33) are equipped with cutting elements 82 made of a hard cutting material. To perform a trailing cut, broach cutting edges 83 enclose an acute angle 85 with longitudinal broach axis 84. Two adjacent cutting edges 83 form a bow angle 87 which closes in the direction of feed 86 and is twice as large as acute angle 85. Every three cutting elements form a cutting unit 88 whose cutting edges 83 are effective over the entire width 89 of broach 81. The leading cutting element, when seen in the direction of feed 86 (initial cutter 90), is centered with respect to longitudinal center axis 84, while the other cutting elements 82 are staggered in pairs on both sides and follow—with respect to the direction of feed 86. Initial cutter 90 here projects beyond the flanks of the other cutting elements 82 in the direction toward workpiece 91.

Figure 33:
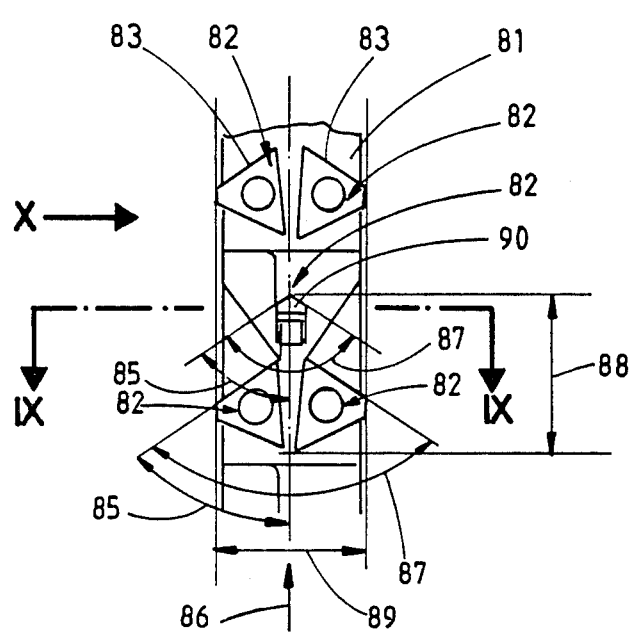
FIG. 33, a top view analogous to FIGS. 26 and 30 of a modified embodiment of the broach.
Figure 35:
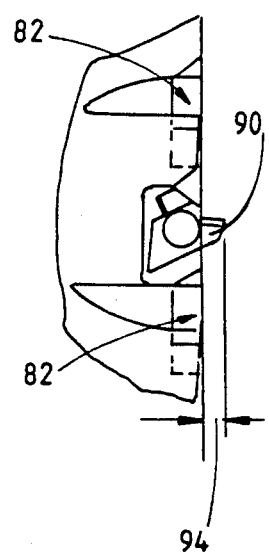
FIG. 35, a side view corresponding to arrow 10 of FIG. 33.
Figure 34:
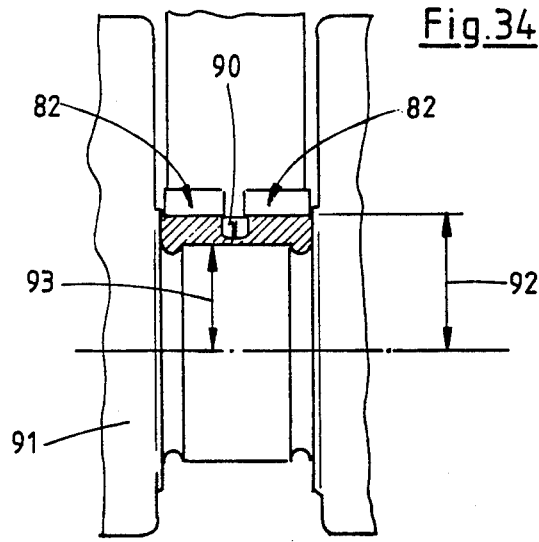
FIG. 34, a view along line IX—IX of FIG. 33 with the broach in the engaged position at the workpiece.

The cutting elements 82 of a cutting unit 88 following initial cutter 90 are arranged in symmetry with the longitudinal center axis. Initial cutter 90 is likewise arranged to by symmetrical with respect to longitudinal center axis 84. Initial cutter 90 may be upright when seen in section (FIGS. 33-35). Cutting elements 82 including initial cutter 90 (FIGS. 26-32) may be standard or ISO plates or may be made, particularly ground, of such plates. Cutting edges 83 arranged on one side of longitudinal broach axis 84 may enclose different angles 85 with longitudinal broach axis 84. At least one of the cutting elements 82 or initial cutter 90 may be a reversible cutting element having a plurality of cutting edges 83.

In a preferred embodiment, the cutting edge 83 of initial cutting element 82 may project beyond the subsequent cutting elements 82 by about the difference between the shoulder allowance 92 and the pin allowance 93 of workpiece 91.

Due to the configuration according to the invention, rough working even of the pin allowance 93 takes place already in the first-cut section.

Broach 101 is provided with a plurality of cutting elements 102 of a hard cutting material which are distributed in the longitudinal direction of the broach and project over its entire width. Cutting elements 102 are provided with cutting edges 103 which are symmetrical to the longitudinal broach axis 104. To perform a trailing cut, the two cutting edges 103 of each cutting element enclose an acute angle 105 with longitudinal broach axis 104 and enclose with one another a bow angle 107 which closes in the direction of broach feed 106. In the direction of broach feed 106, upstream of cutting faces 108 of cutting element 102 disposed at both sides of longitudinal center axis 104, broach body 110 is provided with a chip removal chamber 109. Both chip removal chambers 109 are separated from one another by a ridge 111 extending in the direction of the longitudinal axis 104 of the broach. Ridge 111 is formed by the head of a separating element 112 of a wear-resistant material, particularly a hard metal, which is inserted into broach 101. Ridge 111 forms a straight-line cutting edge extending in an upward and axial direction, with cutting edge flanks 113. The cutting edge has symmetrical flanks, In the direction of broach feed 106, ridge 111 ascends in such a manner that it encloses, with bow-like push edge 116 of cutting element 102 which extends downward from flank 114 between cutting faces 108, an acute angle 115 which closes in the direction of feed 106. Ridge 111 is continued at the lower end of the bow-like pushing edge 116 facing away from the cutting edge, beginning between cutting element cutting faces 108 and continuing in the direction of broach feed 106. The bow-like pushing edge 116 of cutting element 102 between cutting faces 108 is broken that is, chamferred.

Outside of the cutting edge or, more precisely, cutting edge flanks 113, separating element 112 is provided with a cylindrical shaft 117 and is held together therewith in a correspondingly configured recess 122 of broach body 110.

In the region of its cylindrical shaft 117, separating element 112 is provided with a planar flattened portion 118 which is parallel to ridge 111 and to cylinder axis 123. It is charged by the essentially planar frontal face of the head 119 of a compression screw 120 which has been screwed from the side into broach body 110. The cylindrical shaft 117 of the separating element is provided with a step 121 at the end of a flattened portion 118 facing away from ridge 111 in the region where it overlaps the bore for the compression screw. In this way, after compression screw 120 has been unscrewed, it is easy to push separating element 112 out of recess 122 with a screwdriver or the like. The divided chips are marked 124.

We claim:

1. A broach for working the surfaces of pre-cast or preforged pins on workpieces while the workpieces are rotating, the broach comprising:
a broach body extending along a longitudinal axis thereof to be moved in a pushing direction of said axis, and having a roughing section including a first subsection and a second subsection following said first subsection in said pushing direction;
means for working a pin allowance in the workpiece, including a plurality of face cutting plates fastened in said second subsection; and
means for working a shoulder allowance in the workpiece, including a plurality of perforated, reversible shoulder cutting plates replaceable fastened to said broach body in said first subsection, said shoulder cutting plates being formed of a hard cutting material and disposed in pairs side-by-side in a direction approximately perpendicular to said axis, each shoulder cutting plate having cutting means for performing a trailing cut, said cutting means including cutting edges converging toward each other in said pushing direction along lines defining opposite acute angles symmetrical with respect to said axis.

2. A broach for working the surfaces of pre-cast or preforged pins on workpieces while the workpieces are rotating, the broach comprising:
a broach body extending along a longitudinal axis thereof to be moved in a pushing direction of said axis, and having a roughing section; and
a plurality of reversible plates having four cutting edges, replaceably fastened to said broach body in said roughing section formed of a hard cutting material, each plate having cutting means for performing a trailing cut, said cutting means including two of said cutting edges, said two of said cutting edges converging toward each other in said pushing direction along lines defining acute angles on opposite sides of and symmetrical with respect to said axis, said plates having essentially square cover faces having four corners and bounded by said four cutting edges so that said cutting edges converge to said corners, said corners being chamferred to form shoulders.

3. A broach as in claim 2, wherein each shoulder has a linear chamferred edge and a planar shoulder flank which enclose identical angles with the ones of said four cutting edges which converge to the corner of said each shoulder.

4. A broach for working the surfaces of pre-cast or preforged pins on workpieces while the workpieces are rotating, the broach comprising:
a broach body extending along a longitudinal axis thereof to be moved in a pushing direction of said axis, and having a roughing section including a first subsection and a second subsection following said first subsection in said pushing direction, said body including a chassis;
means for working a pin allowance in the workpiece, including a plurality of face cutting plates fastened in said second subsection;
a shoulder cutting plate holder fastened to said chassis in said first subsection; and
means for working a shoulder allowance in the workpiece, including a plurality of reversible shoulder cutting plates replaceably fastened to said shoulder cutting plate holder in said first subsection, said shoulder cutting plates being formed of a hard cutting material and disposed in pairs side-by-side in a direction approximately perpendicular to said axis, each shoulder cutting plate having cutting means for performing a trailing cut, said cutting means including shoulder cutting edges converging toward each other in said pushing direction along lines defining acute angles on opposite sides of and symmetrical with respect to said axis, one of said chassis and said shoulder cutting plate holder having first supporting faces projecting upward therefrom on opposite sides of said axis, the shoulder cutting edges of each shoulder cutting plate including reserve cutting edges having flanks facing said axis and lying against said first supporting faces.

5. A broach for working the surfaces of pre-cast or preforged pins on workpieces while the workpieces are rotating, the broach comprising:
a broach body extending along a longitudinal axis thereof to be moved in a pushing direction of said axis, and having a roughing section; and
a plurality of cutting elements which include perforated reversible plates replaceably fastened to said broach body in said roughing section, said cutting plates being formed of a hard cutting material, said cutting elements having cutting means for performing trailing cuts, said cutting means including cutting edges converging toward each other in said pushing direction along lines defining opposite acute angles on opposite sides of and symmetrical with respect to said axis.

6. A broach as in claim 5, wherein said body has a chassis, the broach further comprising a holder holding said plurality of reversible plates, said holder being replaceably fastened in said chassis in said roughing section so as to replaceably fasten said plurality of reversible plates therein.

7. A broach as in claim 5, wherein said roughing section is subdivided into a first subsection and a second subsection, said second subsection being behind said first subsection in said pushing direction, said first subsection having said plurality of perforated, reversible plates replaceably fastened therein, said plurality of perforated, reversible plates consisting of shoulder cutting plates forming a means for working a shoulder allowance of the workpiece, the broach further comprising means, including a plurality of first face cutting plates in said second subsection, for working a pin allowance of the workpiece.

8. A broach as in claim 7, wherein said shoulder cutting plates are disposed in pairs side-by-side in a direction approximately perpendicular to said axis.

9. A broach as in claim 7, wherein said face cutting plates and said shoulder cutting plates extend across a strip of said body having a width perpendicular to said axis, said face cutting plates each extending across said entire width and having a substantially rhombic cover face, said cover face having a first diagonal and a second diagonal, said first diagonal being longer that said second diagonal and extending widthwise of said body strip.

10. A broach as in claim 9, wherein said face cutting plates each have a first corner facing in said pushing direction, said corner being cut off.

11. A broach as in claim 9, wherein said face cutting plates each have face cutting edges converging toward each other in the pushing direction and side faces respectively adjacent said face cutting edges, said side faces converging toward each other and facing in a direction opposite said pushing direction, said body including a chassis, the broach further comprising a face cutting plate holder fastened to said chassis in said second subsection, one of said chassis and said shoulder cutting plate holder having second supporting faces projecting upward therefrom on opposite sides of said axis and facing in a direction opposite to the pushing direction, said side faces lying against said second supporting faces.

12. A broach as in claim 9, wherein said body further comprises a finishing section, the broach further comprising second face cutting plates each having in cross section a rake angle of 0 degrees, cutting faces and a recess in the form of a concave grinding behind each cutting face.

13. A broach as in claim 12, wherein each of said second face cutting plates have a circumferential shape and a bearing configuration approximately coincident with the circumferential shape and bearing configuration of each of said first face cutting plates.

14. A broach as in claim 7, wherein said face cutting plates have cutting edges having respective positive rake angles.

15. A broach as in claim 5, wherein said cutting elements comprise means, including a first plurality of said cutting elements, for working a final pin dimension of the workpiece, and means, including second and third pluralities of said elements, for pre-roughing a track width of the workpiece, pre-cutting two lateral relief cuts of the workpiece and finally making a control cut in the workpiece and calibrating the track width of the workpiece, wherein said body has a finishing section, said finishing section being subdivided into a third subsection and a fourth subsection, said fourth subsection being behind said third subsection in said pushing direction, and having said second and third pluralities of said cutting elements therein, said third subsection having said first plurality of said cutting elements therein, said first plurality of said cutting elements including a plurality of first finishing face cutting plates, said second plurality of said cutting elements including a plurality of flank cutting plates, said third plurality of said cutting elements including a plurality of second finishing face cutting plates.

16. A broach as in claim 15, wherein said flank cutting plates comprise second perforated reversible plates.

17. A broach as in claim 15, wherein said body includes a chassis, the broach further comprising a first one-piece finishing section holder replaceably fastened to chassis in said third subsection and holding said first plurality of said cutting elements therein and a second one-piece finishing section holder replaceably fastened to said chassis in said fourth subsection and holding said second plurality of said cuttng elements and said third plurality of said cutting elements therein.

18. A broach as in claim 17, further comprising individual cutting element holders, one for each respective cutting element of said first, second and third pluralities of said cutting elements, disposed in said first and second one-piece finishing section holders and holding the respective cutting element therein.

19. Broach according to claim 5, wherein the acute angle is between 30° and 60°.

20. Broach according to claim 5, wherein said reversible plates are each provided with essentially square cover faces.

21. A broach as in claim 5, wherein said cutting elements includes a plurality of flank cutting elements forming a means for calibrating a track width of the workpiece, said body having a finishing section, said finishing section having said plurality of flank cutting elements therein and a flank cutting element holder having spreadable arms, said spreadable arms having respective ones of said flank cutting elements fixed thereto.

22. A broach as in claim 21, further comprising means for spreading said arms apart, said spreading means including a wedge displaceable disposed to spread said arms apart and a set screw for displacing said wedge.

23. A broach as in claim 5, wherein said cutting edges enclose a bow angle which opens in a direction opposite said pushing direction, said cutting edges having interruptions therein.

24. A broach as in claim 23, wherein a plurality of said interruptions are formed in each of said cutting edges.

25. A broach as in claim 23, wherein said cutting elements have cutting faces, said interruptions being formed by recesses in said cutting faces extending to said cutting edges.

26. A broach as in claim 25, wherein said recesses are V-shaped in cross section.

27. A broach as in claim 25, wherein said recesses each have a cross section in the shape of a U.

28. A broach as in claim 27, wherein the U has arms having free ends, said arms diverging toward their free ends.

29. A broach as in claim 23, wherein said cutting elements have cutting edge flanks along said cutting edges, said interruptions being formed by recesses in said cutting edge flanks.

30. A broach as in claim 29, wherein said cutting edges are formed in a cutting plane, said recesses have first recess flanks facing said axis and enclosing an acute angle with respect to a center plane containing said axis and extending prependicularly to said cutting plane, said angle opening in said pushing direction.

31. A broach as in claim 30, wherein said recesses have second recess flanks facing away fron said axis, said second recess flanks with said cutting face forming secondary cutting edges.

32. A broach as in claim 5, wherein a plurality of said cutting elements is staggered one behind another as seen in said pushing direction, individual ones of said cutting edges being formed on successive staggered ones of said cutting elements and having interruptions formed therein as interstices between between said successive staggered ones of said cutting elements.

33. A broach as in claim 32, wherein two of said individual ones of said cutting edges extend next to one another across a width of said broach, said plurality of said cutting elements including a group consisting of a plural odd number of said cutting elements, said group including a foremost cutting element forward of the remainder of the cutting elements in said group when seen in said pushing direction, centered with respect to said axis.

34. A broach as in claim 33, wherein said foremost cutting element is symmetrical with respect to a plane having said axis therein and being perpendicular to a plane containing said cutting edges.

35. A broach as in claim 33, wherein said foremost cutting element is upright in longitudinal extent in section.

36. A broach as in claim 32, wherein said cutting elements are formed of one of standard plates, ISO plates, plates made from standard plates and plates made from ISO plates.

37. A broach as is claim 32, wherein said cutting elements are formed of plates ground from one of ISO plates and standard plates.

38. A broach as in claim 32, wherein for each of said individual ones of said cutting edges, the respective portions thereof on opposite sides of said interstices enclose different angles with respect to said axis.

39. A broach as in claim 5, wherein said cutting elements includes cutting units consisting of an odd number of said cutting elements including a foremost cutting element as seen in said pushing direction and at least one pair of said cutting elements, the cutting elements of said cutting unit having flanks, the pairs of cutting elements being staggered behind the foremost cutting element of the respective cutting unit, said foremost cutting element projecting beyond the flanks of the cutting elements of said pairs of cutting elements.

40. A broach as in claim 39, wherein the cutting elements of the pairs of cutting following said foremost cutting element is structured and disposed symmetrically with respect to said axis.

41. A broach as in claim 39, wherein said foremost cutter is upright with as seen in section.

42. A broach as in claim 39, wherein said cutting elements of said cutting units are formed of one of standard plates, ISO plates, plates made from standard plates and plates made from ISO plates.

43. A broach as is claim 39, wherein said cutting elements of said cutting units are formed of plates ground from one of ISO plates and standard plates.

44. A broach as in claim 39, wherein for each cutting unit on each side of said axis, the foremost cutting element and a cutting element of the following pair of cutting elements have cutting edges facing away from said axis enclosing different angles with respec to said axis.

45. A broach as in claim 39, wherein at least one of said foremost cutting element and the cutting elements of said following pairs of cutting elements is reversible and has a plurality of cutting edges.

46. A broach as in claim 39, wherein said foremost cutting element has cutting edges which project toward a workpiece to be worked having a shoulder allowance and a pin allowance, over said flanks of said following pairs of cutting elements by about the difference between the shoulder allowance and the pin allowance.

47. A broach as in claim 5, wherein:
said cutting elements includes a cutting element having first and second cutting faces on opposite sides of said axis;
said body have first and second chip removal chambers respectively in front of said first and second cutting faces as seen in said pushing direction; and
the broach further includes a separating element formed of a wear resistant material, inserted in said body and having a head, said head forming a ridge extending parallelly to said axis separating said first and second chambers.

48. A broach as in claim 47, wherein said separating element if formed of a hard metal.

49. A broach as in claim 47, wherein said ridge has a linear cutting edge.

50. A broach as in claim 47, wherein said linear cutting edge has symmetrical flanks on opposite sides thereof.

51. A broach as in claim 47, wherein said cutting element having first and second cutting faces has a pushing edge between said first and second cutting faces, said ridge ascending in said pushing direction so as to enclose an acute angle with said pushing edge opening in a direction opposite said pushing direction.

52. A broach as in claim 51, wherein said pushing edge extends upwardly from a lower end thereof and said ridge extends in said pushing direction from said lower end.

53. A broach as in claim 47, wherein said cutting element having first and second cutting faces has a chamferred pushing edge between said first and second cutting faces.

54. A broach as in claim 47, wherein said linear cutting edge has flanks on opposite sides thereof, said separating element having a cylindrical shaft outside of said flanks, said body having a recess configured to said shaft and receiving said shaft therein.

55. A broach as in claim 54, wherein said separating element has in a region of said cylindrical shaft a planar flattened portion having a planar surface which is parallel to the direction of extent of said ridge and to said axis, said body having a bore in a side thereof, the broach further comprising a compression screw having a screw head, said head having a substantially planar surface, said head being screwed into said body from said side thereof through said bore so that the planar surface of said screw charges the planar surface of said separating element.

56. A broach as in claim 55, wherein said flattened portion has an end facing away from said ridge and having a recess in said end of said flattened portion, said recess being covered by said bore.

* * * * *